United States Patent [19]

Ottmann et al.

[11] 3,728,370

[45] Apr. 17, 1973

[54] CATALYTIC PROCESS FOR CONVERTING AROMATIC NITRO COMPOUNDS TO AROMATIC ISOCYANATES

[75] Inventors: Gerhard F. Ottmann, Wuppertal-Elberfeld, Germany; Wilhelm J. Schnabel, Branford; Eric Smith, Madison, both of Conn.

[73] Assignee: Olin Corporation, New Haven, Conn.

[22] Filed: Sept. 16, 1970

[21] Appl. No.: 72,863

Related U.S. Application Data

[63] Continuation-in-part of Ser. No. 703,252, Feb. 6, 1968, abandoned, which is a continuation-in-part of Ser. No. 625,580, March 24, 1967, abandoned.

[52] U.S. Cl. .......260/453 PC, 252/431 R, 252/431 N

[51] Int. Cl. ..........C07c 119/04

[58] Field of Search ..........260/453 PC

[56] References Cited

UNITED STATES PATENTS

| | | | |
|---|---|---|---|
| 3,461,149 | 8/1969 | Hardy et al. | 260/453 PC |
| 3,481,967 | 12/1969 | Ottmann et al. | 260/453 PC |
| 3,481,968 | 12/1969 | Ottmann et al. | 260/453 PC |
| 3,523,962 | 8/1970 | Ottmann et al. | 260/453 PC |
| 3,523,963 | 8/1970 | Kober et al. | 260/453 PC |
| 3,523,964 | 8/1970 | Kober et al. | 260/453 PC |
| 3,523,965 | 8/1970 | Kober et al. | 260/453 PC |
| 3,523,966 | 8/1970 | Ottmann et al. | 260/453 PC |
| 3,576,835 | 4/1971 | Smith et al. | 260/453 PC |
| 3,576,836 | 4/1971 | Prichard | 260/453 PC |
| 3,585,231 | 6/1971 | Hurley et al. | 260/453 PC |

*Primary Examiner*—Floyd D. Higel
*Attorney*—Thomas P. O'Day, Donald F. Clements, Gordon D. Byrkit, Eugene A. Zagarella, Jr. and F. A. Iskander

[57] ABSTRACT

In the process for providing an organic isocyanate by the reaction of an organic nitro compound with carbon monoxide in the presence of a noble metal based catalyst, the improvement which comprises performing the reaction in the presence of an unsaturated organic compound having at least one multiple bond conjugated to another multiple bond in selected aliphatic or cycloaliphatic systems or in the presence of an unsaturated organic compound having at least one multiple bond conjugated to an aromatic hydrocarbon nucleus.

14 Claims, No Drawings

CATALYTIC PROCESS FOR CONVERTING AROMATIC NITRO COMPOUNDS TO AROMATIC ISOCYANATES

This application is a continuation-in-part of our copending application Ser. No. 703,252, filed on Feb. 6, 1968, and now abandoned which was a continuation-in-part of our earlier copending application Ser. No. 625,580, filed on Mar. 24, 1967 which has been abandoned.

This invention relates to the preparation of organic isocyanates from organic nitro compounds.

Organic isocyanates are well-known items of commerce and are currently being provided commercially in very large quantities. They are especially useful and valuable in the preparation of urethane coatings, fibers, and foams. Many organic isocyanates have also been found to be valuable in the preparation of various ureas and carbamates which have outstanding properties in the pesticidal area. Other uses and applications of organic isocyanates are well known to those skilled in this art.

A variety of methods are known for the preparation of organic isocyanates. However, the commercial process for preparing these derivatives utilizes the catalytic hydrogenation of an organic nitro compound to form the corresponding primary amine, followed by reaction of the primary amine with phosgene to form the corresponding isocyanate. This conventional two-step process involves complex and expensive equipment, and the use of the extremely toxic and corrosive phosgene is a particularly undesirable process feature. It has been evident to those familiar with this art that a simplified process for the preparation of organic isocyanates is desirable and would be a valuable contribution to the art.

In order to provide a simplified technique for the preparation of organic isocyanates, it has been proposed to react organic nitro compounds with carbon monoxide in the presence of a catalyst. For example, British Patent No. 1,025,436 discloses a process for preparing organic isocyanates from the corresponding organic nitro compounds by reacting an organic nitro compound at an elevated temperature and an elevated pressure with carbon monoxide in the presence of selected noble metal based catalysts. This process is not suitable for commercial adaptation because no more than trace amounts of organic isocyanates are formed when an organic nitro compound such as, for example, dinitrotoluene is reacted with carbon monoxide at elevated temperature and pressure using a noble metal based catalyst, such as rhodium trichloride, palladium dichloride, iridium trichloride, osmium trichloride, palladium oxide, and the like.

Other proposed simplified techniques utilize other catalyst systems. For example, Belgium Patent No. 672,405 describes the use of a catalyst system of a noble metal and/or a Lewis acid in the reaction between an organic nitro compound with carbon monoxide to provide an organic isocyanate.

Unfortunately, the yield of organic isocyanate afforded by these proposed simplified techniques has not been significant enough to justify their use on a commercial scale.

It is a primary object of this invention to provide an improved process for the preparation of organic isocyanates.

Another object of this invention is to provide an improved one-step process for the direct conversion of organic nitro compounds to organic isocyanates.

Still another object of this invention is to provide a process for the direct conversion of aromatic nitro compounds to aromatic isocyanates in good yield.

A further particular object of this invention is to provide an improved process for providing isocyanatonitrotoluenes and toluene diisocyanates.

Other objects of this invention will be apparent from the following detailed description thereof.

These objects have been accomplished in accordance with the invention disclosed herein. It has now been found that, in the reaction wherein organic isocyanates are provided by the reaction of organic nitro compounds with carbon monoxide in the presence of a noble metal based catalyst, isocyanate yields are significantly and unexpectedly improved by performing the reaction in the presence of either an unsaturated organic compound having at least one multiple bond conjugated to another multiple bond in selected aliphatic or cycloaliphatic systems or in the presence of an unsaturated organic compound having at least one multiple bond conjugated to an aromatic hydrocarbon nucleus. As used in the specification and claims herein, the term "multiple bond" represents either a C═C bond, a C ≡ C bond, or a C ≡ N bond. With respect to those unsaturated organic compounds having at least one multiple bond conjugated to another multiple bond, it is to be understood that the multiple bonds need not be of the same character. Thus, for instance, one multiple bond may be a C═C bond while the other multiple bond may be a C ≡ N bond.

The efficacy of the above-described conjugated compounds in providing significantly improved yields of isocyanates is applicable to the prepartion of any of the isocyanates capable of being prepared by the reaction of organic nitro compounds with carbon monoxide using a noble metal based catalyst. The process of this invention can be utilized in the conversion of aromatic, cycloaliphatic, aliphatic, and heterocyclic mono-or polynitro compounds to organic isocyanates in good yields. Thus, the term "organic nitro compound" as used herein represents substituted as well as unsubstituted nitro derivatives, since in general other substituents on the organic nitro reactants do not inhibit completely the reaction of carbon monoxide with the nitro groups under the conditions of the process disclosed here. Some substituents may also react with the CO concurrently with the nitro groups, and other substituents may impede or retard the desired reaction; but invariably some formation of isocyanate occurs under the process albeit at a reduced rate or in lower yield.

Among the organic nitro compounds which may be utilized in the process disclosed herein are: the aromatic nitro compounds including, for instance, nitrobenzene, nitronaphthalenes, nitroanthracenes, nitrobiphenyls, bis(nitrophenyl)methanes, bis(nitrophenyl)ethers, bis(nitrophenyl)thioethers, bis(nitrophenyl)sulfones, nitrodiphenoxy alkanes, and nitrophenothiazines; the nitrocycloalkanes including, for instance, nitrocyclobutane, nitrocyclopentane, nitrocyclohexane, dinitrocyclohexanes, and bis(nitrocyclohexyl)-methanes; the nitroalkanes including, for instance, nitromethane, nitroethane, nitropropane, nitrobutanes, nitrohexanes, nitrooctanes, nitrooctadecanes, dinitroethane, dinitropropanes, dinitrobutanes, dinitrohexanes, dinitrodecanes, phenyl nitromethane, bromophenyl nitromethanes, nitrophenyl nitromethanes, methoxy phenyl nitromethanes, bis-(nitromethyl)cyclohexanes, and bis-(nitromethyl)benzenes.

As mentioned in the above discussion, organic nitro compounds having additional substituents may also be employed in the process described herein. For instance, the aforementioned compounds may be substituted with one or more additional substituents such as nitro, nitroalkyl, alkyl, alkoxy, aryloxy, halogen, alkylthio, arylthio, carboxyalkyl, cyano, ioscyanato, and the like and employed as reactants in the novel process of this invention. Thus, included among the suitable organic nitro compounds which may be converted to isocyanates utilizing the process of this invention are: o-nitrotoluene, m-nitrotoluene, p-nitrotoluene, o-nitro-p-xylene, 2-methyl-1-nitro-naphthalene, m-dinitrobenzene, p-dinitrobenzene, 2,4-dinitrotoluene, 2,6-dinitrotoluene, dinitromesitylene, 4,4'-dinitrobipehnyl, 2,4-dinitrobiphenyl, 4,4'-dinitrobibenzyl, bis(p-nitrophenyl)methane, bis(2,4-dinitrophenyl) methane, bis(2,4-dinitrophenyl)ether, bis(p-nitrophenyl)ether, bis(p-nitrophenyl)thioether, bis(p-nitrophenyl)sulfone, bis(p-nitrophenoxy)ethane, α,α'-dinitro-p-xylene, 2,4,6-trinitrotoluene, 1,3,5-trinitrobenzene, 1-chloro-2-nitrobenzene, 1-chloro-4-nitrobenzene, 1-chloro-3-nitrobenzene, 2-chloro-6-nitroluene, 4-chloro-3-nitroluene, 1-chloro-2,4-dinitrobenzene, 1,4-dichloro-2-nitrobenzene, alpha-chloro-p-nitrotoluene, 1,3,5,-trichloro-2-nitrobenzene, 1,3,5-trichloro-2,4e-dinitrobenzene, 1,2-dichloro-4-nitrobenzene, alpha-chloro-m-nitrotoluene, 1,2,4,-trichloro-5-nitrobenzene, 1-bromo-4-nitrobenzene, 1-bromo-2-nitrobenzene, 1-bromo-3-nitrobenzene, and 1-bromo-2,4-dinitrobenzene.

Also included among the suitable organic nitro compounds which may be employed are: α,α-dibromo-p-nitrotoluene, α-bromo-p-nitrotoluene, 1-fluoro-4-nitrobenzene, 1-fluoro-2,4-dinitrobenzene, 1-fluoro-2-nitrobenzene, o-nitrophenyl isocyanate, m-nitrophenyl isocyanate, p-nitrophenyl isocyanate, o-nitroanisole, p-nitroanisole, p-nitrophenetole, o-nitrophenetole, 2,4-dinitrophenetole, 2,4-dinitroanisole, 1-chloro-2,4-dimenhoxy-5-nitrobenzene, 1,4-dimethoxy-2-nitrobenzene, m-nitrobenzaldehyde, p-nitrobenzaldehyde, p-nitrobenzoylchloridde, m-nitrobenzoylchloride, 3,5-dinitrobenzoylchloride, ethyl-p-nitrobenzoate, methyl-o-nitrobenzoate, m-nitrobenzenesulfonylchloride, p-nitrobenzenesulfonylchloride, o-nitrobenzenesulfonylchloride, 4-chloro-3-nitrobenzenesulfonylchloride, 2,4-dinitrobenzenesulfonylchloride, 3-nitrophthalic anhydride, p-nitrobenzonitrile m-nitrobenzonitrile, 1,4-dinitrocyclohexane, bis(p-nitrocyclohexyl)methane, 1-nitro-n-hexane, 2,2-dimethyl-1-nitrobutane, 1,6-dinitro-n-hexane, 1,4-bis(nitromethyl)cyclohexane, 3,3'-dimethoxy-4,4'-dinitro-biphenyl, and 3,3'-dimethyl-4,4'-dinitro-biphenyl.

Isomers and mixtures of the aforesaid organic nitro compounds and substituted organic nitro compounds may also be utilized in the practice of this invention as well as homologues and other related compounds. Generally, the starting nitro compound reactants contain between 1 and about 20 and preferably below about 14 carbon atoms. Compounds which have both nitro and isocyanato substituents may also be employed as reactants. It has been found that during the conversion of polynitro compounds to organic isocyanates using the process disclosed herein, considerable amounts of this type of compound are provided along with the polyisocyanate products. Thus, for instance, in the conversion of dinitrotoluenes to the corresponding diisocyanates, it has been found that compounds such as 2-isocyanato-4-nitrotoluene are also isolated. Since the process of this invention is conveniently adaptable to batchwise, semi-continuous, or continuous operations, the nitro-isocyanato derivative may be utilized as a starting reactant in a new batch operation or may simply be directly converted to 2,4-toluene diisocyanate by recycling in a continuous practice of this process.

The process of this invention is particularly effective in the conversion of aromatic nitro compounds having up to 20 carbon atoms and especially six to 14 carbon atoms to the corresponding aromatic isocyanates. As used herein, the term "aromatic nitro compounds" represents those organic compounds having at least one nitro group attached directly to a carbocyclic aromatic hydrocarbon nucleus such as benzene, naphthalene, and the like wherein the aromatic hydrocarbon nucleus may also contain other substituents as, for instance, illustrated in the preceding discussion relating to "organic nitro compound." Among the preferred organic nitro compounds which may be used in the practice of this invention are the nitrobenzenes, both mono- and polynitro, including isomeric mixtures thereof; the nitroalkylbenzenes, including the various nitrated toluenes and the nitrated xylenes; nitrated biphenyl and nitrated diphenylmethylene. Other preferred reactants which can be particularly mentioned include the bis(nitrophenoxy)alkylenes and the bis(nitrophenoxy)alkyl ethers.

At least one noble metal based catalyst must be employed in conjunction with the conjugated organic compounds in accordance with the process of this invention. As used herein, "noble metal based catalyst" represents one of the noble metal elements palladium, ruthenium, rhenium, rhodium, osmium, gold, platinum or iridium and compounds of these elements such as their oxides, halides, sulfates, nitrates, cyanides, and so forth. Mixtures of such noble metal based catalysts may be employed if so desired.

While the improved yields of organic isocyanates are provided by the use of the conjugated organic derivatives in combination with any of the above-identified noble metal based catsylsts, particularly beneficial results have been observed when the noble metal halides and/or oxides are employed as the required catalyst. Several of the aforementioned noble metals may exist in more than one valence state in compounds of this sort (e.g., $PtCl_2$, $PtCl_4$), and thus it is understood that this preferred class of halide and oxide catalysts is broad enough to cover such compounds.

Included among the preferred catalysts which may be used are, for instance: palladium dibromide, palladium dichloride, palladium difluoride, palladium trifluoride, palladium diiodide, rhodium tribromide, rhodium trichloride, rhodium trifluoride, rhodium tetrafluoride, rhodium diiodide, ruthenium dichloride, ruthenium trichloride, ruthenium tetrachloride, rhenium chlorides, osmium dichloride, osmium trichloride, osmium tetrachloride, platinum dibromide, platinum tetrabromide, platinum dichloride, platinum tetrachloride, iridium trichloride, palladium monoxide (PdO), rhodium sesquioxide ($Rh_2O_3$), rhodium dioxide ($RhO_2$), ruthenium dioxide, ruthenium tetraoxide, osmium dioxide, osmium tetraoxide, and platinum oxide. Particularly preferred catalysts are the halides and oxides of palladium and rhodium which may be utilized separately or in combination to provide excellent ultimate yields of organic isocyanates.

Usually, the noble metal based catalysts are employed in an amount of at least 0.001 molar percent based on molar amount of organic nitro compound utilized as reactant. However, the amount of catalyst employed can be varied considerably depending on the particular reaction mixtures and apparatus utilized in the isocyanate preparations. Generally, a convenient amount of catalyst utilized is in the range of about .05 – 5.0 molar percent based on molar amount of organic nitro compound.

The noble metal based catalysts used can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

As mentioned in the foregoing discussion, the process of this invention requires the use of either an unsaturated organic compound having at least one multiple bond conjugated to another multiple bond in selected aliphatic or cycloaliphatic systems or an unsaturated organic compound having at least one multiple bond conjugated to an aromatic hydrocarbon nucleus. Particularly useful are those aliphatic systems both branched and unbranched having from three to 15 carbon atoms and those cycloaliphatic systems having from five to 15 carbon atoms. Thus, for instance, the aliphatic chain may be substituted by alkyl groups (particularly lower alkyl of one to four carbon atoms) or by aryl groups including for instance phenyl, tolyl, naphthyl, and the like. In addition, the aliphatic and cycloaliphatic chains and the substituent alkyl or aryl groups may also substituted with alkoxy, aryloxy, halogen (Cl, Br. I, F, etc.), cyano and other similar groups which are inert under the reaction conditions and do not react with the products formed. As used in the specification and claims herein then, it is understood that the terms "aliphatic system" and "-cycloaliphatic system" do not encompass aliphatic or cycloaliphatic derivatives containing hydroxy, amino, mercapto, carboxyl, and like substituents which are known to be reactive with isocyanates.

A wide variety of unsaturated organic compounds having at least one multiple bond conjugated to another multiple bond in an aliphatic or cycloaliphatic system may be employed in the practice of this invention. For instance, among the compounds which are useful are nitriles of the formula $$R—CH{=}CH—C \equiv N \qquad (I)$$

wherein R, for instance, represents hydrogen; alkyl preferably alkyl having one to four carbon atoms; aryl or substituted aryl such as phenyl and naphthyl each of which may be substituted by other substituents as, for instance, alkyl, alkoxy, halogen, and so forth; cyano; and halogen such as chlorine, fluorine, bromine, or iodine. Illustrative compounds of this type which may be specifically mentioned are acrylonitrile, crotonitrile, cinnamonitrile, 3,4-dimethoxy-α-phenylcinnamonitrile, and fumaronitrile but any nitrile of the general formula (I) may be utilized in the practice of this invention.

In accordance with the prior discussion, polyenes in general are not suitable for use in the practice of this invention, but only those polyenes having a conjugated system of double bonds may be used advantageously. Thus, for instance, butadiene and substituted butadienes may be used in this process. It has been found that cycloaliphatic dienes having a conjugated system of double bonds are more effective than the straight chain derivatives such as, for example, butadiene. Thus, among the more effective cycloaliphatic systems which may be utilized in the process described herein is 1,3-cyclooctadiene. Conversely, 1,5-cyclooctadiene is ineffective in this process because of the lack of the appropriate conjugated double bond system. Other suitable compounds to be used in the practice of this invention are cyclopentadienes, cyclohexadienes and cyclododecadienes with the appropriate conjugated systems of C=C bonds.

A great number of unsaturated organic compounds having at least one multiple bond conjugated to an aromatic hydrocarbon nucleus are also suitable for use in this invention. For instance, it has been found that aromatic nitriles wherein one or more nitrile groups are attached to an aromatic hydrocarbon nucleus having from six to 18 carbon atoms (e.g., benzene, naphthalene, biphenyl, terphenyl, and the like) are especially useful in this process.

Thus, benzonitrile and derivatives of benzonitrile wherein the phenyl ring is substituted by substituents such as halogen, alkyl (particularly lower alkyl of one to four carbon atoms), alkoxy (particularly lower alkoxy of one to four carbon atoms), cyano, and the like are used in the practice of this invention. Included among these suitable compounds are halobenzontitriles such as 2-bromobenzonitrile, 3-bromobenzonitrile, 4-bromobenzonitrile, 2-chlororbenzonitrile, 3-chlorobenzonitrile, 4-chlorobenzonitrile, 2-fluorobenzonitrile, 3-fluorobenzonitrile, and 4-fluorobenzonitrile; dihalobenzonitriles such as 2,6-dibromobenzonitrile, 2,6-dichlorobenzonitrile, and 2,6-difluorobenzonitrile, as well as other higher halogenated benzonitriles such as pentafluorobenzonitrile. Included among other substituted benzonitriles which may also be employed in the practice of this invention are alkylated benzontriles such as o-tolunitrile, m-tolunitrile, p-tolunitrile, 2,3-dimethylbenzonitrile, and 2,3-diethylbenzonitrile; and alkoxylated benzonitriles such as o-methyoxybenzonitrile, m-methoxybenzonitrile, p-methoxybenzonitrile, 2,3-dimethoxybenzonitrile, 2,6-dimethoxybenzonitrile, 3,4-dimethoxybenzonitrile, 3,5-dimethoxybenzonitrile, and 3,4,5-trimethoxybenzonitrile. Other aromatic mononitriles which may be advantageously employed in the practice of this invention include 2-chloro-6-methylbenzonitrile, 1-cyanonaphthalene, and 2-cyanonaphthalene. Also included among suitable conjugated systems are the aromatic dinitriles such as phthalodinitrile, isophthalodinitrile, and terephthalodinitrile and derivatives thereof wherein the aromatic hydrocarbon nucleus is substituted by one or more halogen, alkyl, or alkoxy groups similar to the aforementioned substituents on the benzonitrile nucleus.

Further included among the conjugated systems useful in the practice of this invention are those organic derivatives having a C ≡ C bond conjugated to an aromatic hydrocarbon nucleus which may or may not be substituted by other groups such as halogen, alkyl (particularly lower alkyl of one to four carbon atoms), alkoxy (particularly lower alkoxy of one to four carbon atoms), and the like. For instance, included in this group are compounds such as phenylacetylene and diphenylacetylene, and so forth. In a similar fashion, organic compounds having a C=C bond conjugated to an aromatic hydrocarbon nucleus are also useful in providing enhanced isocyanate yields by the process disclosed herein. Thus, styrene and substituted styrenes where the phenyl nucleus has been substituted by substituents such as halogen, alkyl (particularly lower alkyl of one to four carbon atoms), alkoxy (particularly lower alkoxy of one to four carbon atoms), or aryl (particularly those having six to ten carbon atoms) substituents have been found to be useful in the practice of this invention. Exemplificative of useful compounds of this nature are: o-fluorostyrene, m-fluorostyrene, p-fluorostyrene, o-chlorostyrene, m-chlorostyrene, p-chlorostyrene, o-bromostyrene, m-bromostyrene, and p-bromostyrene; the isomeric dibromostyrenes and dichlorostyrenes; alkylated styrenes such as methyl styrene; dialkylated styrenes such as dimethyl styrene; alkoxylated styrenes such as methoxy styrene, and so forth.

Many other organic compounds having a C=C bond conjugated to an aromatic hydrocarbon nucleus are also advantageously utilized in the practice of this invention. Illustrative of such additional compounds are the α-alkyl styrenes, the β-alkyl styrenes, the stilbenes, the diaryl butadienes such as 1,4-diphenylbutadienes and the like. From the foregoing discussion, it is evident that the term "aromatic hydrocarbon nucleus" includes those aromatic ring systems having substituents such as alkyl, alkoxy, cyano, halogen (Cl, Br, I, F) and the like which are inert under the conditions of the reaction disclosed herein, but the term "aromatic hydrocarbon nucleus" as used herein does not encompass those aromatic ring systems having hydroxy, amino, mercapto, carboxyl or like substituents which are known to be reactive with the isocyanate reaction products.

While the use of even traces of the aforementioned conjugated systems in conjunction with the noble metal based catalysts begins to provide isocyanates in improved yields, it has been found that for practical purposes the conjugated system should be used in an amount of at least 0.002 molar percent based on the molar amount of organic nitro compound reactant. Preferably, the conjugated system should be utilized in an amount of at least 1.0 – 250.0 molar percent based on the amount of organic nitro compound reactant, and even more preferably in an amount of about 5.0 – 50.0 molar percent, as for instance exemplified by Examples 3–8 and 10–14. Greater amounts may be utilized if desired, but surprisingly the use of larger amounts occasionally actually reduces the yield of isocyanate since production of sizeable amounts of undesirable by-products sometimes occurs at the expense of isocyanate yield.

The previously reported reactions of carbon monoxide with organic nitro compounds using a noble metal based catalyst to provide isocyanates were performed at elevated pressure and at an elevated temperature range, and the improved process of this invention utilizing the conjugated organic derivative is carried out in a similar manner.

Thus, the process described herein can be performed at a reaction temperature of at least 60°C., and a preferred temperature range of about 125°– 250°C. is generally employed. Higher temperatures can be employed, but decomposition of either reactants or products begins to occur at such higher levels, and thus it is preferred not to operate at these temperature levels. Interior and/or exterior heating and cooling means may be utilized to maintain the temperature within the reactor within the desired range.

The process must be carried out at elevated pressure, and it has been determined that the pressure within the reactor must be at least 30 psi., although reactors pressurized up to 50,000 psi, or even higher may be utilized. Generally, the process of this invention can be performed using a preferred pressure range of about 500 – 8,000 psi.

The process of this invention operates effectively in the absence of a solvent or diluent, but improved overall yields of the organic isocyanates can be obtained when a solvent or diluent which is chemically inert to the components of the reaction system is employed. Suitable solvents or diluents include halogenated aliphatic and aromatic hydrocarbons such as dichloromethane, tetrachloroethane, monochloronaphthalene, monochlorobenzene, dichlorobenzene, α-chloronaphthalene, and perchloroethylene, esters such as dibutylphthalate, as well as sulfur dioxide, mixtures thereof and the like.

The proportion of solvent or diluent is not critical and any proportion may be employed which will not require excessively large equipment to contain. Generally, the weight percent of organic nitro compound in the solvent is in the range between about 5.0 and about 75 percent, but greater or lesser proportions may be employed if desired.

Since the process described herein requires elevated pressure conditions, the reactions must be carried out in an autoclave or any other high pressure reactor. Preferably the pressure vessel is equipped with stirring or rocking means. The order of mixing the reactants is not critical and may be varied within the limitations of the equipment employed. In one typical embodiment, the organic nitro compound, the noble metal based catalyst, and the selected conjugated organic compound and, if desired, solvent are charged to a stirrer-equipped autoclave which was previously purged with nitrogen. Carbon monoxide is fed into the autoclave until the desired pressure is provided which as mentioned must be at least 30 psi. There should be at least three moles of carbon monoxide used per nitro group in the organic nitro reactant, but it is advantageous to use molar excesses of monoxide in order to provide higher pressures. If desired, additional carbon monoxide can be added to the autoclave either intermittently or continuously as the reaction progresses. The highest carbon monoxide requirements are generally utilized in a process in which the carbon monoxide is added continuously, but suitable recycle of the carbon monoxide containing gas streams greatly reduces the overall consumption of carbon monoxide.

The autoclave elements are heated at the previously disclosed temperature range wherein isocyanate formation occurs. Reaction periods vary depending upon the particular reactant and catalyst employed, but, in general, between five minutes and eighteen hours are required for completion of the reaction.

When reaction is complete, the autoclave is generally cooled to ambient temperature prior to venting and removal of the crude reaction product. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, freezing, etc., may be employed to separate the organic isocyanate from the unreacted organic nitro compound and any by-products that may be formed. All the above-illustrated separation techniques may be carried out continuously.

The following examples are presented to further illustrate the invention without any intention of being limited thereby. All parts and percentages are by weight unless otherwise specified.

EXAMPLE 1

A mixture consisting of 25.0 g. of nitrobenzene, 25.0 ml. of chlorobenzene, 1.0 g. of rhodium trichloride, and 1.0 g. of palladium dichloride was charged to a 300 ml. rocking autoclave. The reactor was closed, purged with nitrogen, and pressurized with carbon monoxide to an initial pressure of 1350 psig. Rocking was started and the reactor was heated to 190°C. tThe reactor was maintained at a constant temperature of 190°C. for a period of five hours, and then the reactor was cooled to room temperature. The resulting reaction mixture was filtered, and analysis of the filtrate by vapor phase chromatography revealed that a yield of phenylisocyanate not exceeding 2 percent was attained.

EXAMPLE 2

A mixture consisting of 25.0 g. of nitrobenzene, 25.0 g. of α-methylstyrene, 25.0 ml. of chlorobenzene, 1.0 g. of palladium dichloride, and 1.0 g. of rhodium trichloride was charged to a 300 ml. rocking autoclave. The reactor was closed, purged with nitrogen, and pressurized with carbon monoxide to an initial pressure of 1350 psig. Rocking was started, and the reactor was heated to 190°C. with the pressure increasing gradually to a maximum of 1890 psig. At 190°C. the pressure started to drop, and the reaction mixture was maintained at 190°C. for five hours, and then cooled to room temperature. The final pressure at 25°C. was 860 psig. The reaction mixture was filtered, and the filtrate distilled and analyzed. Yield: 21 percent of phenylisocyanate.

EXAMPLE 3

A mixture of 25.0 g. of nitrobenzen, 25 ml. of chlorobenzene, 5.0 g. of terephthalodinitrile, 1.0 g. of rhodium trichloride, and 1.0 g. of palladium dichloride was reacted with carbon monoxide under conditions outlined in the previous examples. The reaction mixture was filtered from solids consisting of catalyst and excessive terephthalodinitrile, and the filtrate was analyzed by vapor phase chromatography. A 35 percent yield of phenylisocyanate was obtained.

EXAMPLE 4

A mixture consisting of 25.0 g. of nitrobenzene, 25.0 ml. of chlorobenzene, 5.0 g. of phthalonitrile, 1.0 g. of rhodium trichloride, and 1.0 g. of palladium dichloride was reacted as described in Example 2. Analysis of the reaction mixture by vapor phase chromatography revealed that a 40 percent yield of phenylisocyanate had been obtained.

EXAMPLE 5

A 300 ml. autoclave was charged with 25.0 g. of nitrobenzene, 25.0 ml. of chlorobenzene, 5.0 g. of phenylacetylene, 1.0 g. of rhodium trichloride, 1.0 g. of palladium dichloride, and pressurized with carbon monoxide to 1400 psig. Rocking was started and the reactor change heated to 174°C. and kept at this temperature for eight hours. The reaction was accompanied by a pressure loss owing to the consumption of carbon monoxide. The reactor was repressurized with CO at frequent intervals until no further pressure drop was recorded. The reaction mixture was distilled from resinous products to afford a 14 percent yield of phenylisocyanate.

EXAMPLE 6

A mixture consisting of 25.0 g. of nitrobenzene, 25 ml. of chlorobenzene, 5.0 g. of trans-stilbene, 1.0 g. of rhodium trichloride, and 1.0 g. of palladium dichloride was allowed to react with carbon monoxide under the conditions specified in Example 2. Phenylisocyanate was obtained in a yield of 18 percent.

EXAMPLE 7

A mixture consisting of 25.0 g. of nitrobenzene, 25 ml. of chlorobenzene, 1.0 g. of rhodium trichloride, 1.0 g. of palladium dichloride, and 2.5 g. of benzonitrile was reacted with carbon monoxide, duplicating the conditions described in Example 2. Complete analysis of the reaction mixture revealed that phenylisocyanate was formed in a 58 percent yield.

EXAMPLE 8

2,4-Dinitrotoluene (25.0 g.), benzonitrile (5.0 g.), palladium dichloride (1.40 g.), and monochlorobenzene (25.0 g.) were placed in a 300 ml. stainless steel autoclave, equipped with a high-speed stirrer. The autoclave was pressured with carbon monoxide to 1300 psig. and heated, with stirring, to 55°–60°C. for one hour and then at 170°C. for one and one-fourth hours. The maximum pressure in the autoclave, at the latter temperature, was 1600 psig. The autoclave was then cooled, excess gas was vented, and the contents were filtered. Analysis of the filtrate by vapor phase chromatography revealed that a 68.5% yield of 2-isocyanato-4-nitrotoluene, a 17 percent yield of 4-isocyanato-2-nitrotoluene and a four percent yield of 2,4-toluene diisocyanate had been obtained.

EXAMPLE 9

The details of Example 8 were repeated wherein every detail was identical except that the benzonitrile component was omitted from this example. Vapor phase chromatographic analysis of the reaction contents revealed that only slight traces of 2-isocyanato-4-nitrotoluene and 4-isocyanato-2-nitrotoluene had been obtained, and there was no indication at all of the formation of toluene diisocyanate.

EXAMPLE 10

To a 300 ml. stainless steel autoclave fitted with a stirrer (1200 rpm) was charged 25 g. of 2,4-dinitrotoluene, 25 g. of monochlorobenzene, 2.0 g. of platinum tetrachloride ($PtCl_{14}$), and 5.0 g of benzonitrile. The autoclave was sealed, pressured with nitrogen to 1000 psi., vented, repressured with nitrogen and revented, then pressured with carbon monoxide to 940 psi. The autoclave was stirred and heated to 175°C. and held at that temperature for four hours. The autoclave was then cooled and vented, and the contents were removed and analyzed by vapor phase chromatography. Yield of 2-isocyanato-4-nitrotoluene was 20 percent.

This experiment was repeated wherein every detail was identical except that the benzonitrile component was omitted. Analysis of the reaction product revealed that 2-isocyanato-4-nitrotoluene had been obtained in less than 2 percent yield.

EXAMPLE 11

To a 300 ml. stainless steel autoclave fitted with a stirrer (1200 rpm) was charged 25 g. of 2,4-dinitrotoluene, 25 g. of monochlorobenzene, 2.0 g. of platinum dichloride (platinous chloride $PtCl_2$), and 5.0 g. of benzonitrile. The autoclave was sealed, pressured with nitrogen to 1000 psi., vented, repressured with nitrogen and revented, then pressured with carbon monoxide to 940 psi. The autoclave was stirred and heated to 175°C. and held at that temperature for four hours. The autoclave was then cooled and vented, and the contents were removed and analyzed by vapor phase chromatography. The yield of 2-isocyanato-4-nitrotoluene was 22 percent.

EXAMPLE 12

5.0 g. of 2,4-Dinitrotoluene, 1.0 g. of benzonitrile, 0.3 g. of iridium trichloride, and 5 ml. of monochlorobenzene were charged to a 100 ml. stainless steel rocking autoclave (36 cycles per minute). The autoclave was pressured with carbon monoxide to 1210 psi. and was then heated with rocking to a temperature of 175°C., whereupon the pressure rose to 1770 psi. The autoclave was held at this temperature for four hours and was then cooled, vented, and the contents were removed and analyzed by vapor phase chromatography. The yield of 2-isocyanato-4-nitrotoluene was 43 percent.

EXAMPLE 13

5.0 g. of 2,4-Dinitrotoluene, 1.0 g. of phthalonitrile, 0.3 g. of palladium chloride ($PdCl_2$), and 5 ml. of monochlorobenzene were charged to a 100 ml. stainless steel rocking autoclave (36 cycles per minute). The autoclave was pressured with carbon monoxide to 1210 psi. and was then heated with rocking to a temperature of 175°C., whereupon the pressure rose to 1720 psi. The autoclave was held at this temperature for four hours and was then cooled, vented, and the contents were removed and analyzed by vapor phase chromatography. The yield of 2-isocyanato-4-nitrotoluene was 64 percent.

EXAMPLE 14

2,4-Dinitrotoluene (25.0 g.), benzonitrile (5.0 g.) palladium dichloride (1.0 g.), rhodium trichloride (1.0 g.) and monochlorobenzene (25.0 g.) were placed in a 300 ml. stainless steel autoclave agitated with a high-speed stirrer. The autoclave was pressured with carbon monoxide to 1050 psig. and heated with stirring to 170°C. for four hours. The maximum pressure in the autoclave at the reaction temperature was 1300 psig. The autoclave was then cooled, excess gas was vented, and the contents were analyzed by vapor phase chromatography. The yields of isocyanate products were 39.4 percent of 2-isocyanato-4-nitroluene, 15.4 percent of 4-isocyanato-2-nitrotoluene, and 11.5 percent of 2,4-toluene diisocyanate.

What is claimed is:

1. In the process for preparing an aromatic isocyanate which comprises reacting a carbocyclic aromatic nitro compound having up to 20 carbon atoms with carbon monoxide at an elevated temperature and an elevated pressure in the presence of a catalytic amount of a halide or oxide of palladium, ruthenium, rhenium, rhodium, osmium, gold, platinum, or iridium, the improvement which comprises performing said reaction in the presence of a material selected from the group consisting of a. an organic compound having a multiple bond conjugated to another multiple bond in an aliphatic system having three to 15 carbon atoms; or b. an organic compound having a multiple bond conjugated to another multiple bond in a cycloaliphatic system having five to 15 carbon atoms; or c. an organic compound having a multiple bond conjugated to an aromatic hydrocarbon nucleus having from six to 18 carbon atoms, each said multiple bond being independently selected from the group consisting of $C=C$, $C \equiv C$ and $C \equiv N$, said aliphatic system, said cycloaliphatic system and said aromatic hydrocarbon nucleus not containing any substituents selected from the group consisting of hydroxy, amino, mercapto and carboxyl, said catalyst being employed in an amount of .001–5.0 molar percent based on molar amount of said aromatic nitro compound, and said material being employed in an amount of .002–250.0 molar percent based on molar amount of said aromatic nitro compound.

2. The process of claim 1 wherein said material is employed in an amount of 5.0–50.0 molar percent based on molar amount of said aromatic nitrocompound.

3. The process of claim 1 wherein a dinitrotoluene is employed as said aromatic nitro compound reactant.

4. The process of claim 1 wherein said material is an organic compound having a multiple bond conjugated to an aromatic hydrocarbon nucleus having from six to 18 carbon atoms.

5. The process of claim 4 wherein said material is an aromatic nitrile.

6. The process of claim 5 wherein said aromatic nitrile is benzonitrile, or benzonitrile substituted by halogen, lower alkyl, or lower alkoxy substituents.

7. The process of claim 4 wherein said material is an aromatic compound having a C ≡ C moiety attached to said aromatic hydrocarbon nucleus.

8. The process of claim 4 wherein said material is an aromatic compound having a C═C moiety attached to said aromatic hydrocarbon nucleus.

9. The process of claim 8 wherein said aromatic compound is styrene, or styrene substituted by halogen, lower alkyl, or lower alkoxy substituents.

10. In the process for preparing an aromatic isocyanate which comprises reacting a carbocyclic aromatic nitro compound having six to 14 carbon atoms with carbon monoxide at an elevated temperature and an elevated pressure in the presence of a catlytic amount of a halide or oxide of rhodium or palladium, said catalyst being employed in an amount of .05–5.0 molar percent based on molar amount of said aromatic nitro compound, the improvement which comprises performing said reaction in the presence of an organic compound having a multiple bond conjugated to an aromatic hydrocarbon nucleus having from six to 18 carbon atoms, said organic compound being employed in an amount of 1.0–250.0 molar percent based on molar amount of said aromatic nitro compound, said multiple bond being selected from the group consisting of C═C, C ≡ C and C ≡ N, and said aromatic hydrocarbon nucleus not containing any substituents selected from the group consisting of hydroxy, amino, mercapto and carboxy.

11. The process of claim 10 wherein said organic compound is employed in an amount of 5.0 – 50.0 molar percent based on molar amount of said aromatic nitro compound.

12. The process of claim 10 wherein said organic compound is an aromatic nitrile.

13. The process of claim 10 wherein a dinitrotoluene is employed as said aromatic nitro compound reactant.

14. The process of claim 1 wherein said catalyst is employed in an amount of .05–5.0 molar percent based on molar amount of said aromatic nitro compound and said material is employed in an amount of 1.0–250.0 molar percent based on molar amount of said aromatic nitro compound.

* * * * *